(12) United States Patent
Brown et al.

(10) Patent No.: US 9,104,710 B2
(45) Date of Patent: Aug. 11, 2015

(54) METHOD FOR CROSS-DOMAIN FEATURE CORRELATION

(71) Applicant: SRC, Inc., North Syracuse, NY (US)

(72) Inventors: Eric W. Brown, Sherrill, NY (US); Matthew S. Sweeney, Baldwinsville, NY (US); Matthew J. Campbell, Liverpool, NY (US); Maryjane D. Poulin, Morrisville, NY (US); Christopher R. Mamorella, Kirkville, NY (US); Craig R. Olrich, Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 188 days.

(21) Appl. No.: 13/832,791

(22) Filed: Mar. 15, 2013

(65) Prior Publication Data
US 2014/0280183 A1 Sep. 18, 2014

(51) Int. Cl.
*G06F 17/30* (2006.01)
(52) U.S. Cl.
CPC .... *G06F 17/30321* (2013.01); *G06F 17/30489* (2013.01)
(58) Field of Classification Search
CPC .............. G06F 17/30321; G06F 17/30; G06F 17/30684; G06F 17/30424; G06F 17/28; G06F 3/1275; G06F 3/1204; G06F 3/1205; G06F 3/121; G06F 3/1282; G06F 17/30489; G06F 17/30477; G06Q 30/0631; G06Q 10/10; G06Q 10/06; G06Q 50/32; G06Q 10/04; G06Q 10/0633; G06Q 30/0203
USPC ......... 707/741, 740, 765, 776, 769, 748, 728, 707/764, 768, 723, 732, 736, 750, 804, 707/E17.044, E17.058, E17.008, E17.083, 707/E17.014, E17.017; 704/270.1, 9, 704/E11.001, 1; 717/106; 726/24
See application file for complete search history.

(56) References Cited

U.S. PATENT DOCUMENTS 7,031,764 B2 * 4/2006 Schwartz et al. ............. 600/518
7,461,056 B2 12/2008 Cao et al.
(Continued)

OTHER PUBLICATIONS

Yingzi Dua; Craig Belchera; Zhi Zhoua; and Robert Ivesb—"Feature correlation evaluation approach for iris feature quality measure"—Signal Processing—vol. 90, Issue 4, Apr. 2010, pp. 1176-1187; Special Section: Ethnic Music Audio Documents: From the Preservation to the Fruition.*

(Continued)

*Primary Examiner* — Anh Ly
(74) *Attorney, Agent, or Firm* — George R. McGuire; Blaine T. Bettinger; Bond Schoeneck & King, PLLC

(57) ABSTRACT

A method for correlating information across distinct domains without requiring feature co-occurrence. The disparate information collections are broken down into features, and a correlation index with correlation score is created. To determine the correlation between distinct domains, an information artifact collection is reduced to a representational set of features, these features are replaced with correlated features using the correlation index, and the new set of features is matched against the second information artifact collection using an appropriate comparison technique. The correlation method allows a single input artifact to be matched against an existing collection, resulting in a set of correlated artifacts from the disparate collection, each ranked by correlation score.

13 Claims, 4 Drawing Sheets

| Step 1 | Step 2 | Step 3 |
|---|---|---|
| The Jericho I was based on the French Dassault MD-600 design, and has the Israeli name of "Luz." The missile is reported as having a 500 kilogram high-explosive warhead, but could be fitted with nuclear warheads as well. It is unknown whether they are allocated to this role. The Jericho is carried on a wheeled transporter erector vehicle (TEL) or on railroad car launchers. | The *Jericho I* was based on the *French Dassault MD-600 design*, and has the *Israeli name* of "Luz." The missile is reported as having a *500 kilogram high-explosive warhead*, but could be fitted with *nuclear warheads* as well. It is unknown whether they are allocated to this role. The Jericho is carried on a *wheeled transporter erector vehicle (TEL)* or on *railroad car launchers*. | The *Jericho I* was based on the *French Dassault MD-600 design*, and has the *Israeli name* of "Luz." The missile is reported as having a *500 kilogram high-explosive warhead*, but could be fitted with *nuclear warheads* as well. It is unknown whether they are allocated to this role. The Jericho is carried on a *wheeled transporter erector vehicle (TEL)* or on *railroad car launchers*. |
| Step 4 | Step 5 | Step 6 |
| The *Jericho I* was base on the *French Dassault MD-600 design*, and has the *Israeli name* of "Luz." The missile is report as having a *500 kilogram high-explosive warhead*, but could be fit with *nuclear warheads* as well. It is unknown whether they are allocate to this role. The Jericho is carr on a *wheeled transporter erector vehicle (TEL)* or on *railroad car launcher* . | The *Jericho I*   base *French Dassault MD-600 design*   *Israeli name*  Luz   missile report   having  *500 kilogram high explosive warhead*   fit   *nuclear warhead*   is allocate   role Jericho  car   *wheeled transporter erector vehicle TEL*   *railroad car launcher* | *Jericho I* *French Dassault MD-600 design*   *Israeli name*  Luz   missile         *500 kilogram high explosive warhead*   *nuclear warhead* allocate   role Jericho  carr   *wheeled transporter erector vehicle TEL*   *railroad car launcher* |

(56) References Cited

U.S. PATENT DOCUMENTS

| | | | |
|---|---|---|---|
| 7,499,934 B2 | 3/2009 | Zhang et al. | |
| 7,512,605 B2 | 3/2009 | Spangler | |
| 7,539,536 B2* | 5/2009 | Schwartz et al. | 600/518 |
| 7,584,175 B2 | 9/2009 | Patterson | |
| 7,584,221 B2 | 9/2009 | Robertson et al. | |
| 7,593,932 B2 | 9/2009 | Lindh et al. | |
| 7,890,170 B2* | 2/2011 | Ettori et al. | 607/14 |
| 8,239,820 B1* | 8/2012 | White et al. | 717/101 |
| 2004/0093035 A1* | 5/2004 | Schwartz et al. | 607/5 |
| 2005/0234904 A1* | 10/2005 | Brill et al. | 707/5 |
| 2007/0073678 A1* | 3/2007 | Scott et al. | 707/5 |
| 2007/0130561 A1* | 6/2007 | Siddarampappa et al. | 717/106 |
| 2008/0104063 A1 | 5/2008 | Gallivan et al. | |
| 2008/0162455 A1 | 7/2008 | Daga et al. | |
| 2008/0281915 A1* | 11/2008 | Elad et al. | 709/204 |
| 2008/0294621 A1* | 11/2008 | Kanigsberg et al. | 707/5 |
| 2009/0037389 A1 | 2/2009 | Kothari et al. | |
| 2009/0037390 A1 | 2/2009 | Handley | |
| 2009/0089078 A1* | 4/2009 | Bursey | 705/1 |
| 2009/0125498 A1 | 5/2009 | Cao et al. | |
| 2009/0240687 A1 | 9/2009 | Eskebaek | |
| 2009/0282057 A1* | 11/2009 | Thomas | 707/100 |
| 2009/0287678 A1* | 11/2009 | Brown et al. | 707/5 |
| 2010/0100543 A1* | 4/2010 | Brady | 707/732 |
| 2010/0318423 A1* | 12/2010 | Kanigsberg et al. | 707/723 |
| 2011/0258170 A1* | 10/2011 | Duggan et al. | 707/705 |
| 2011/0258182 A1* | 10/2011 | Singh et al. | 707/723 |
| 2011/0271232 A1* | 11/2011 | Crochet et al. | 715/810 |
| 2012/0002868 A1* | 1/2012 | Loui et al. | 382/159 |
| 2012/0296918 A1* | 11/2012 | Morris et al. | 707/748 |
| 2012/0330869 A1* | 12/2012 | Durham | 706/16 |
| 2013/0007020 A1* | 1/2013 | Basu et al. | 707/750 |
| 2013/0080426 A1* | 3/2013 | Chen et al. | 707/723 |
| 2013/0311481 A1* | 11/2013 | Bhatt et al. | 707/741 |
| 2014/0351227 A1* | 11/2014 | Christodorescu et al. | 707/692 |

OTHER PUBLICATIONS

Eugene Borovikov; and Ilya Zavorin—"A Multi-stage Approach to Arabic Document Analysis"—Guide to OCR for Arabic Scripts 2012, pp. 55-78.*

Viji, S, Term and Document and Visualization for a set of Documents, Stanford University, pp. 1-8, 2002.

Klein, M., et al., Correlation of Term Count and Document Frequency for Google N-Grams, In Proceedings of the 31th European Conference on IR Research on Advances in Information Retrieval (ECIR '09), Mohand Boughanern, Catherine Berrut, Josiane Mothe, and Chantal Soule-Dupuy (Eds.). Springer-Verlag, Berlin, Heidelberg, 620-627. DOI=10.1007/978-3-642-00958-7_58 http://dx.doi.org/10.1007/978-3-642-00958-7_58, 2009.

Blake, C, A Comparison of Document, Sentence, and Term Event Spaces, In Proceedings of the 21st International Conference on Computational Linguistics and the 44th annual meeting of the Association for Computational Linguistics (ACL-44). Association for Computational Linguistics, Stroudsburg, PA, USA, 601-608. DOI=10.3115/1220175.1220251 http://dx.doi.org/10.3115/1220175.1220251 pp. 601-608, 2006.

* cited by examiner

| Step 1 | Step 2 | Step 3 |
|---|---|---|
| The Jericho I was based on the French Dassault MD-600 design, and has the Israeli name of "Luz." The missile is reported as having a 500 kilogram high-explosive warhead, but could be fitted with nuclear warheads as well. It is unknown whether they are allocated to this role. The Jericho is carried on a wheeled transporter erector vehicle (TEL) or on railroad car launchers. | The *Jericho I* was based on the *French Dassault MD-600 design*, and has the *Israeli name* of "Luz." The missile is reported as having a *500 kilogram high-explosive warhead*, but could be fitted with *nuclear warheads* as well. It is unknown whether they are allocated to this role. The Jericho is carried on a *wheeled transporter erector vehicle (TEL)* or on *railroad car launchers*. | The *Jericho I* was based on the *French Dassault MD-600 design*, and has the *Israeli name* of "Luz." The missile is reported as having a *500 kilogram high-explosive warhead*, but could be fitted with *nuclear warheads* as well. It is unknown whether they are allocated to this role. The Jericho is carried on a *wheeled transporter erector vehicle (TEL)* or on *railroad car launchers*. |
| Step 4 | Step 5 | Step 6 |
| The *Jericho I* was base on the *French Dassault MD-600 design*, and has the *Israeli name* of "Luz." The missile is report as having a *500 kilogram high-explosive warhead*, but could be fit with *nuclear warheads* as well. It is unknown whether they are allocate to this role. The Jericho is carr on a *wheeled transporter erector vehicle (TEL)* or on *railroad car launcher* . | The *Jericho I* base *French Dassault MD-600 design* *Israeli name* Luz missile report having *500 kilogram high explosive warhead* fit *nuclear warhead* is allocate role Jericho car wheeled *transporter erector vehicle TEL railroad car launcher* | *Jericho I* *French Dassault MD-600 design* *Israeli name* Luz missile *500 kilogram high explosive warhead* *nuclear warhead* allocate role Jericho carr wheeled *transporter erector vehicle TEL railroad car launcher* |

FIG. 4

METHOD FOR CROSS-DOMAIN FEATURE CORRELATION

BACKGROUND OF THE INVENTION

1. Field of the Invention

The present invention relates to a method for data correlation, and, more specifically, to a method for correlation of information across distinct domains.

2. Description of the Related Art

In information rich environments, knowledge of the relationships between information artifacts (such as software applications, datasets, websites, news articles, links, or many other types of information and data) is necessary to ensure that relevant information is made available when and where it is needed. The World Wide Web provides a readily available example, with its vast collection of documents and the familiar task of creating search strings to locate desired documents. Numerous examples of similar information retrieval and organization tasks exist in any scenario that involves the production and consumption of information, including government intelligence communities, where collectors and reporters produce information artifacts that must be disseminated to the necessary consumers; criminal investigation and legal services, where vast amounts of documentation must be organized and searched to discover information relevant to a given case; news services, where stories must be categorized and linked based on topical similarity; and customer service management where customer requests and complaints must be routed to the relevant representative or directed to relevant information.

When the environment contains a large number of information artifacts, manual encoding of the relationships between artifacts becomes difficult or impossible. To solve this problem, a number of methods, such as the Term Frequency-Inverse Document Frequency ("TF-IDF") method have been devised and implemented for automatically determining the relationships between artifacts.

Prior art methods typically determine similarity between two artifacts using features shared in common between the artifacts. For example, correlation between two documents—such as document A and document B—containing English language text can be determined by comparing the similarity of features such as words, phrases, or concepts contained in each document (often requiring some form of natural language pre-processing). The impact of any given feature on the document correlation metric would typically take one or more of the following into consideration:

1. Frequency of occurrence of the feature in document A;
2. Frequency of occurrence of the feature in document B;
3. Frequency of occurrence of the feature in the corpus;
4. Total number of features in document A;
5. Total number of features in document B;
6. Placement of the feature in document A;
7. Placement of the feature in document B; and/or
8. Domain or pragmatic knowledge about the feature (ontologies), among many others.

Such methods have proven effective for identifying artifacts with a high degree of correlation to a given artifact in cases where information in the given artifact and the collection is conveyed using similar features. In cases where the given artifact and the collection use disparate sets of features, this methodology is ineffective due to the lack of feature co-occurrence (i.e., occurrence of a feature both in the given artifact and the target artifact) or the requirement to build and maintain large, complex, and dynamic ontologies.

This disparity between features or artifacts in a given artifact versus a target collection can occur for a number of reasons, including differences in language or culture (for example, an English language query targeted at a collection of French language documents), differences in collection purpose (for example, a marketing brochure matched against a collection of detailed product specifications), differences in format (for example, entries from the sales tracking databases from two companies), differences in sub-language (for example, using a chemical research paper to find similar papers in a repository of medical research papers), or natural shifts in terminology over time (for example, news articles placed in predefined categories based on similarity to legacy news articles), among many, many others.

As a result, there is a continued need for an improved information artifact methodology that correlates information artifacts across distinct domains, including where there is a lack of feature co-occurrence.

BRIEF SUMMARY

It is therefore a principal object and advantage to provide a method for correlating information artifacts across distinct domains.

It is another object and advantage to provide a method for correlating information artifacts across two or more domains despite the existence of disparities between artifacts in these domains.

It is a further object and advantage to provide a method for correlation using known or identified linkages between portions of disparate information artifact collections to determine feature-level linkages between the collections.

Other objects and advantages will in part be obvious, and in part appear hereinafter.

According to an aspect, a method for data correlation comprising the steps of: (i) providing a first correlation between a first information artifact collection and a second information artifact collection; (ii) extracting at least a first feature from a second information artifact in the first information artifact collection and at least a first feature from a second information artifact in the second information artifact collection; (iii) selecting the extracted features; (iv) creating a correlation index between the selected features in the two collections; (v) extracting a feature from a third information artifact in the first information artifact collection; (vi) applying the correlation index to the newly-extracted feature; (vii) computing a correlation score between the extracted feature and at least a first feature from one or more information artifacts in the second information artifact collection. According to one embodiment, the first correlation links a feature from a first information artifact in the first information artifact collection to at least a first feature from a first information artifact in the second information artifact collection.

According to another aspect, the extracting step further comprises the steps of: (i) identifying a first lexical category in a second information artifact in the first information artifact collection; (ii) identifying a first phrase in the information artifact; (iii) normalizing a first term in said information artifact; (iv) removing all features except for nouns, verbs, and phrases from the information artifact; and (v) removing each feature that occurs only once in the information artifact.

According to a third aspect, the creating step further comprises the steps of: (i) pairing at least a first feature extracted from the second information artifact in the first information artifact collection with at least a first feature extracted from a second information artifact in the second information artifact collection; and (ii) calculating a correlation score between the paired features.

According to a fourth aspect, the applying step further comprises the steps of: (i) comparing an extracted feature from the third information artifact to each feature in the correlation index; (ii) matching the extracted feature to one feature from at least one paired feature in the correlation index; (iii) retrieving the matching feature pair from the correlation index; and (iv) using the computed correlation score to rank each retrieved feature.

According to a fifth aspect is provided a system for data correlation comprising: (i) means for providing a first correlation between a first information artifact collection and a second information artifact collection; (ii) means for extracting at least a first feature from a second information artifact in the first information artifact collection and at least a first feature from a second information artifact in the second information artifact collection; (iii) means for selecting at least the first extracted features from the first and second information artifact collections; (iv) means for creating a correlation index between the selected features; (v) means for extracting at least a first feature from a third information artifact in the first information artifact collection; (vi) means for applying the correlation index to the newly-extracted feature; and (vii) means for computing a correlation score between the extracted feature and at least a first feature from one or more information artifacts in the second information artifact collection.

According to a sixth aspect, the extracting means further comprises: (i) means for identifying a first lexical category in a second information artifact in the first information artifact collection; (ii) means for identifying a first phrase in the information artifact; (iii) means for normalizing a first term in the information artifact; (iv) means for removing all features except for nouns, verbs, and phrases from the information artifact; and (v) means for removing each feature that occurs only once in the information artifact.

According to a seventh aspect, the creating means comprises: (i) means for pairing at least a first feature extracted from the second information artifact in the first information artifact collection with at least a first feature extracted from a second information artifact in the second information artifact collection; and (ii) means for calculating a correlation score between each of the paired features.

According to an eighth aspect, the applying means further comprises: (i) means for comparing the newly-extracted feature each feature in said correlation index; (ii) means for matching the newly-extracted feature to one feature from at least one paired feature in the correlation index; and (iii) means for retrieving the matching feature pair from the correlation index.

According to another aspect, a non-transitory computer-readable storage medium containing program code comprising: (i) program code for providing a first correlation between a first information artifact collection and a second information artifact collection; (ii) program code for extracting at least a first feature from a second information artifact in said first information artifact collection and at least a first feature from a second information artifact in said second information artifact collection; (iii) program code for selecting at least said first extracted features from said first and second information artifact collections; (iv) program code for creating a correlation index between said selected features; (v) program code for extracting at least a first feature from a third information artifact in said first information artifact collection; (vi) program code for applying said correlation index to said first feature extracted from said third information artifact; and (vii) program code for computing a correlation score between said first feature extracted from said third information artifact and at least a first feature from one or more information artifacts in said second information artifact collection.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 4 is a table containing an example of feature extraction for a natural language text document according to an embodiment.

DETAILED DESCRIPTION

According to one embodiment, the method described herein automatically determines correlation between information artifacts without requiring feature co-occurrence between target documents and without requiring encoding of domain or pragmatic knowledge about features. In addition, the described method functions regardless of language, domain, or data type. The method can be broken into two distinct steps: (A) Correlation Indexing; and (B) Matching. Each of these steps is described in detail below.

(A) Correlation Indexing

Given two disparate information collections, a predefined set of correlations linking artifacts in one collection to artifacts in the other, and a feature extraction method for each collection, the method creates an index between the features of the two collections. The index takes the form of a table containing every pair of features from each collection (ex, Collection A feature and Collection B feature), as well as a Correlation Score. The Correlation Score can be, for example, a number between one and zero, where a higher number indicates a greater degree of correlation. However, one skilled in the art will recognize that any method of scoring is possible. In addition, the index optionally comprises term frequency and inverse document frequency ("TF-IDF") counts for each individual feature. Other components of the index are possible and often depend upon pre-programmed settings or the individual requirements of the user, among other things.

Note that for efficiency, all feature pairs with a Correlation Score beneath a desired threshold can be removed from the index. The threshold can be a factory-preset threshold, can be selected by the user during installation, can be set by the user before or during each use, or any combination thereof, among many other methods of threshold determination known to those skilled in the art. In one embodiment, previous studies or trials analyzing optimum threshold settings and/or training sets can be used to determine appropriate threshold settings. The threshold may even be determined and/or modified all or in part based on the information artifacts in the analysis. For example, the nature of some information artifacts may be such that a higher Correlation Score is typically required for satisfactory results. Alternatively, some information artifacts may consistently produce satisfactory results with a lower-then-normal, lower-than-average, or lower-than-desired Correlation Score.

Figure 1:
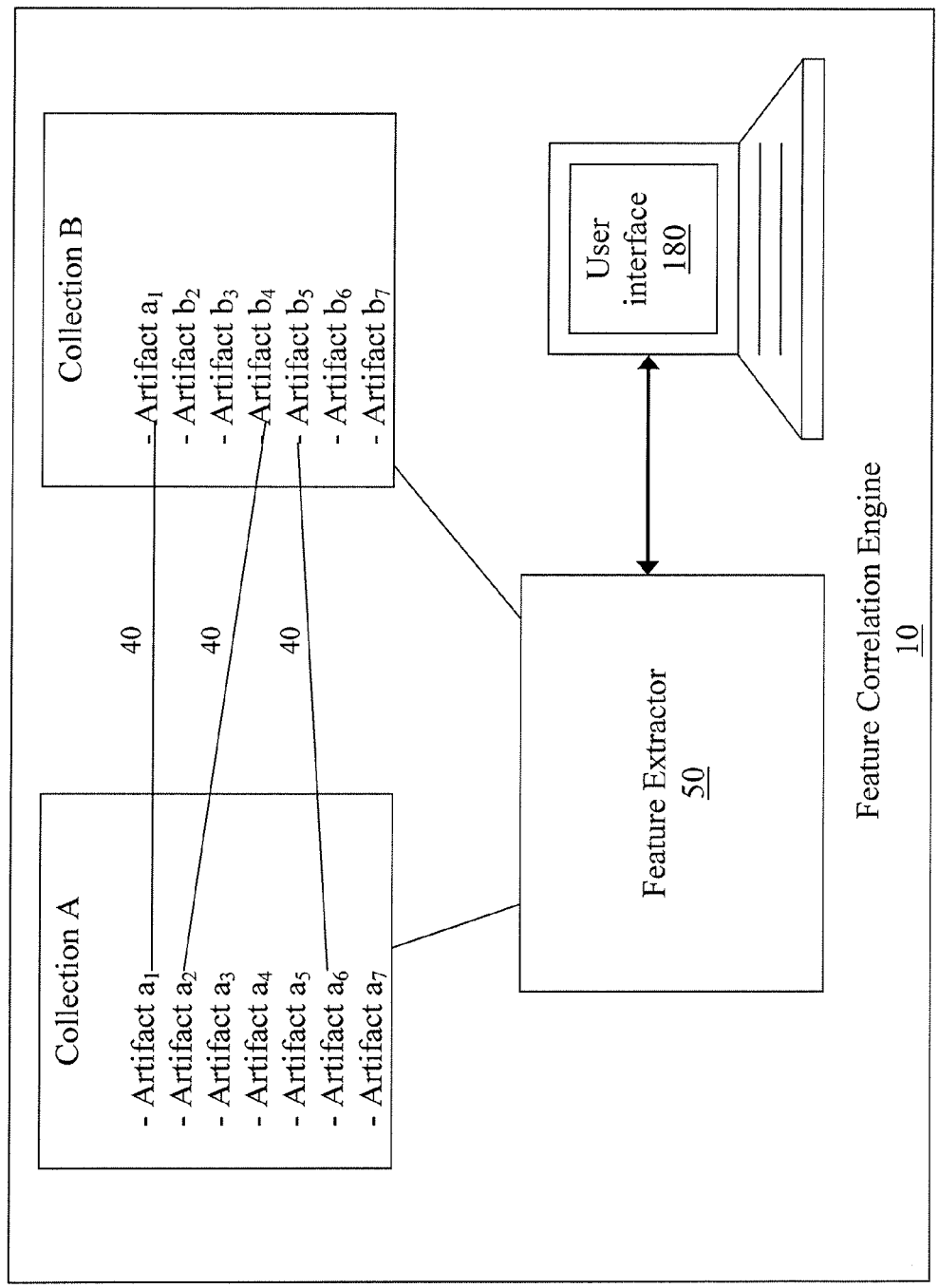
FIG. 1 is a schematic representation of a Feature Correlation Engine according to an embodiment.

Referring now to the drawings, wherein like reference numerals refer to like parts throughout, there is seen in FIG. 1 a schematic representation of a Feature Correlation Engine 10 according to one embodiment of the present invention. The system analyzed by Feature Correlation Engine 10 comprises at least the following:

(1) Two disparate collections of information artifacts, Collection A and Collection B (although many more collections are possible depending upon the needs or requests of the user);

(2) A set of links 40 between information artifacts in Collection A and information artifacts in Collection B where a link signifies the type of correlation for automatic identification;

(3) A Feature Extractor 50 capable of reducing an information artifact in Collection A to a discrete set of features; and (4) A Feature Extractor 50 capable of reducing an information artifact in Collection B to a discrete set of features.

Figure 2:
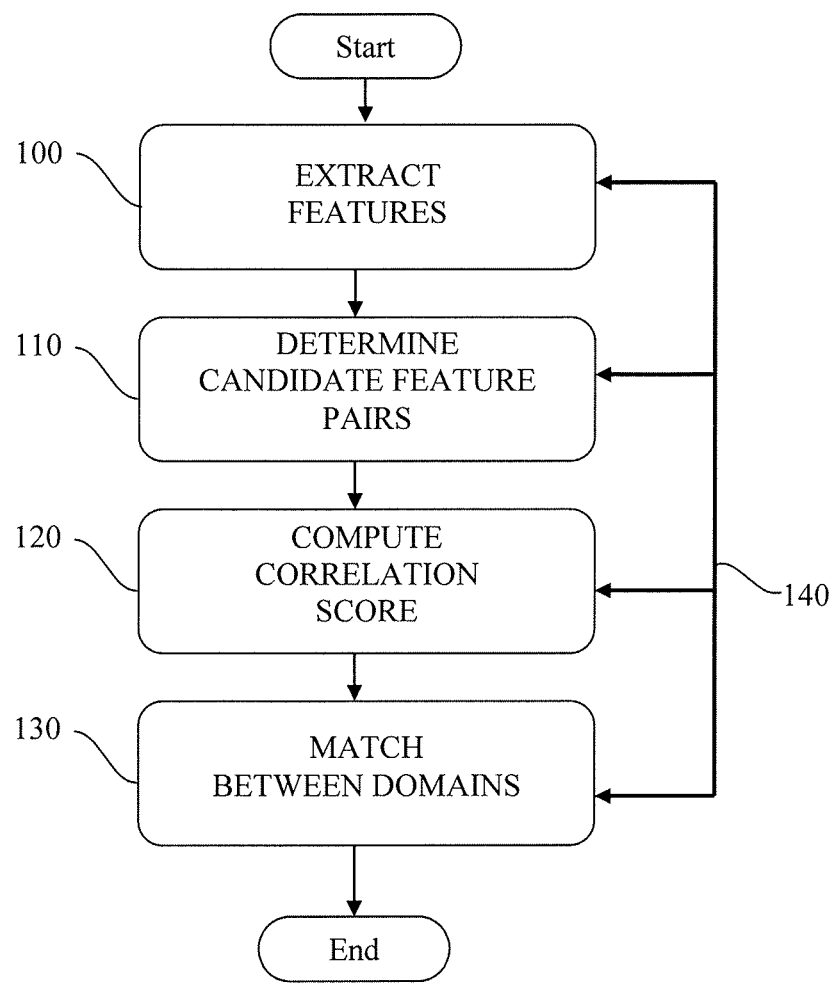
FIG. 2 is a flowchart of an information artifact correlation method according to an embodiment.

Using Correlation Engine 10, the following Correlation Indexing steps are performed, as shown in FIG. 2: (i) at step 100, Feature Extractor 50 extracts features from each artifact; (ii) at step 110, the Correlation Engine determines candidate feature pairs; and (iii) at step 120, the engine computes the Correlation Score for each feature pair. Each of the Correlation Indexing steps is described in greater detail below.

Extract Features

According to one embodiment of the invention, at step 100 of the method each information artifact is decomposed into a set of representational features. Depending on the type of information artifacts contained in the collection and the type of correlations targeted, the feature extractor will take different forms. For example, information artifacts containing electronic signals could be reduced to frequency, time, and location features; computer network logs could be reduced to discrete, time stamped categories of anomalies and patterns; and documents containing natural language text could be reduced to content bearing words, phrases, and concepts. Those skilled in the art will recognize that there are an unlimited number of ways to reduce information artifacts to one or more representational features.

Among other reasons, features should be carefully selected for their collective ability to do the following: (i) adequately represent each information artifact within the collection; (ii) distinguish each information artifact from other artifacts within the collection; and (iii) represent relationships between—or generalizations across—artifacts within the collection. Although the invention can optionally be extended to incorporate continuous features, discrete features are often more useful for automatically identifying correlations between information artifacts. A detailed example of feature extraction for natural language text documents is provided in FIG. 4.

According to an embodiment, steps 1, 2 and 3 of the method apply the following linguistic analysis techniques (as depicted in FIG. 4):

(1) Identify lexical categories;
(2) Identify phrases; and
(3) Normalize terms.

According to an embodiment, steps 4, 5, and 6 of the method, meanwhile, remove non content-bearing features (as depicted in FIG. 4):

(4) Remove all but nouns, verbs, and phrases;
(5) Remove features that occur once; and
(6) Remove features that occur in less than 50% of classes.

Note that for any feature extraction methodology, the concept of a feature can be extended to encompass more complex features. In the general case, a feature can be defined as any feature extracted by the given feature extractor (a 'simple feature'); the absence of a simple feature; or the co-occurrence of two or more features, among other definitions. For example, some features considered in the natural language document scenario might be "nuclear_warhead; NOT Iraq" (the presence of this feature meaning that 'Iraq' does not occur in the given document), and "Jericho AND NOT launcher" (meaning that 'Jericho' does occur while 'launcher' does not).

Determine Candidates

At step 110, the Correlation Engine determines candidate feature pairs. The amount of computing resources and time required to create the Correlation Index is dependent on the number of feature pairs considered. Given unlimited time and resources, all pairs can be considered. According to a preferred embodiment of the invention, however, the system includes one or more methods for limiting the set of pairs considered. This can include methods that limit the set of pairs based solely on numbers, based on time, based on available resources, based on predetermined thresholds, or any combination thereof, as well as other methods known in the art. The limitation method may also factor in the type(s) of input information, or other qualities of the data to be correlated.

According to an embodiment of the invention, the simplest method for limiting feature pair candidates is to remove all pairs which do not co-occur. Co-occurrence of two features, c and f, in this case means that: (i) c occurs in one or more information artifacts in Collection A; (ii) f occurs in one or more information artifacts in Collection B; and (iii) for at least one information artifact, a, in Collection A which contains feature c, there exists at least one information artifact, b, in Collection B containing feature b for which the pair a and b are linked in the pre-defined Collection Correlation Training Data.

In an embodiment, this method is used as an initial pass to narrow the set of feature pairs considered. In most cases however, this simplistic method will not sufficiently reduce the total number of features being considered. For this reason, any simplistic feature selection method can be applied to the co-occurrence of the feature pair, such as frequency, TF-IDF, and combined term strength, among many others.

Compute Correlation

At step 120, the Correlation Engine computes the Correlation Score for each feature pair. Multiple methods exist for computing correlation between features in a given information artifact collection, including simple document co-occurrence frequency, feature mutual information, information gain, and mutual information, among many others. According to one embodiment of the present invention, one or more of these methods is modified to compute correlation between a feature from one information artifact collection and a feature from another information artifact collection given a set of links between information artifacts in the two collections. Depending on the type of information artifacts, the type of features selected, the amount of training data, and the type of correlations targeted, different methods will have different degrees of effectiveness. For correlations between natural language documents, the mutual information method has proven effective. This method is described in further detail below. It should be noted that although the mutual information method is described below, other methods mentioned and/or described herein, or known to those of skill in the art, can be used in other embodiments of the present invention.

According to an embodiment, the mutual information method makes use of the following variables:

"mi"=mutual information;
"c"=a given feature from A;
"f"=a given feature from B;
"N"=total # of artifacts in B;
"$N_{1\_}$"=# artifacts in B with feature f;
"$N_{0\_}$"=# artifacts in B without feature f;
"$N_{\_1}$"=# artifacts in B linked to an artifact in A with feature c;
"$N_{\_0}$"=# artifacts in B not linked to an artifact in A with feature c;
"$N_{11}$"=# artifacts in B with feature f and linked to an artifact in A with feature c;
"$N_{00}$"=# artifacts in B without feature f and not linked to an artifact in A with feature c;
"$N_{10}$"=# artifacts in B with feature f and not linked to an artifact in A with feature c; and
"$N_{01}$"=# artifacts in B without feature f and linked to an artifact in A with feature c.

According to an embodiment, the mutual information variables are entered into the following equation:

$$mi(c, f) = \frac{N_{11}}{N} \log_2 \frac{N * N_{11}}{N_{1\_} N_{\_1}} + \frac{N_{01}}{N} \log_2 \frac{N * N_{01}}{N_{0\_} N_{\_1}} + \frac{N_{10}}{N} \log_2 \frac{N * N_{10}}{N_{1\_} N_{\_0}} + \frac{N_{00}}{N} \log_2 \frac{N * N_{00}}{N_{0\_} N_{\_0}}$$

According to an embodiment, Feature Correlation Engine 10 optionally includes a User Interface 180. This user interface can include a display means, a programming means, and/or other components known to those skilled in the art. The user interface can be used to monitor the progress of the correlation method, which thus necessitates a monitoring system. The monitoring system can query each of the method's components, or there can be a pre-programmed requirement that the components periodically—or at certain stages of analysis—report to the monitoring system. The user interface can also be used to modify the monitoring system. User interface 180 can also be used to program, modify, monitor, or otherwise interact with other steps, stages, or variables of the correlation method.

(B) Matching

At step 130 of the method, in order to determine the correlation between information artifacts in disparate collections, one artifact is reduced to a representational set of features, these features are replaced with correlated features using the Correlation Index, and this new set of features is matched against the second artifact using an appropriate comparison technique. The comparison technique should be selected based on the type of data and type of correlation targeted. According to one embodiment of the invention, TF-IDF and/or Case Based Reasoning comparison methods are implemented. The method allows a single input artifact to be matched against an existing collection, resulting in a set of correlated artifacts from the disparate collection, each ranked by correlation score.

The general case outlining the comparison of a single artifact from the domain of each collection is described below. Given the following:

(1) An information artifact, a, in the same domain as artifacts from Collection A;

(2) An information artifact, b, in the same domain as artifacts from Collection B;

(3) A Correlation Index created from the analysis of Collections A and B; and (4) The feature extractors for Collection A and Collection B used in the creation of the given Correlation Index;

Then the following steps are applied:

(1) Extract features $f_{a1} \ldots f_{aj}$ from a using the Collection A feature extractor;

(2) Extract features $f_{b1} \ldots f_{bk}$ from b using the Collection B feature extractor;

(3) For each of the features extracted from a, look up the correlated features using the Correlation Index;

(4) Using the set of correlated features, TF-IDF score for each feature, and the feature correlation score for each feature, compute the hypothesized similarity between a and b using the following equation. Similarity between artifacts is computed by maximizing the cross product of a similarity coefficient and the mutual information score, $mi(f_a, f_b)$, from each feature from the correlation index;

$$\text{Similarity}(a, b) = \sum_{j,k} w \times mi(f_{aj}, f_{bk})$$

(5) Using the hypothesized similarity for a and b, present b as a match to a if the similarity meets an expert-determined or machine-learned threshold, t; and (6) Order the set of matched artifacts by their similarity score.

Depending on the type of information artifacts, the types of features being selected, the amount of training data used, and the desiring ranking method, different methods will be chosen for similarity calculation. Other methods for similarity calculation include the use of classification systems and other probabilistic methods of analysis known to those of skill in the art. For correlations between natural language documents, the feature vector-based approach combining case based reasoning with TF-IDF scoring has proven effective. This method is described in further detail below. It should be noted that although one similarity scoring method is described below, other methods mentioned and/or described herein, or known to those of skill in the art, can be used in other embodiments of the present invention.

In one embodiment, this method is used to enable selection of the most relevant artifacts and is useful in circumstances when the feature space is not fixed and can be added to over time using new feature extraction methods. The case based reasoning system is trained by all artifacts from Collection B. Each case in the system corresponds to one information artifact as the "answer" and its associated features from the correlation index comprise the labels for the cells of the feature vector. Each cell in the feature vector contains the set of values necessary to compute the similarity score for that feature. A preferred embodiment for calculating similarity between natural language artifacts includes the TF-IDF score as part of the weighting coefficient, w, although other factors for the coefficient can be used by those of skill in the art. For each feature vector the system calculates the similarity score as defined in Equation 2, compares the score to the threshold value, th, and returns an ordered list of artifacts that meet or exceed the threshold.

EXAMPLE

Figure 3:
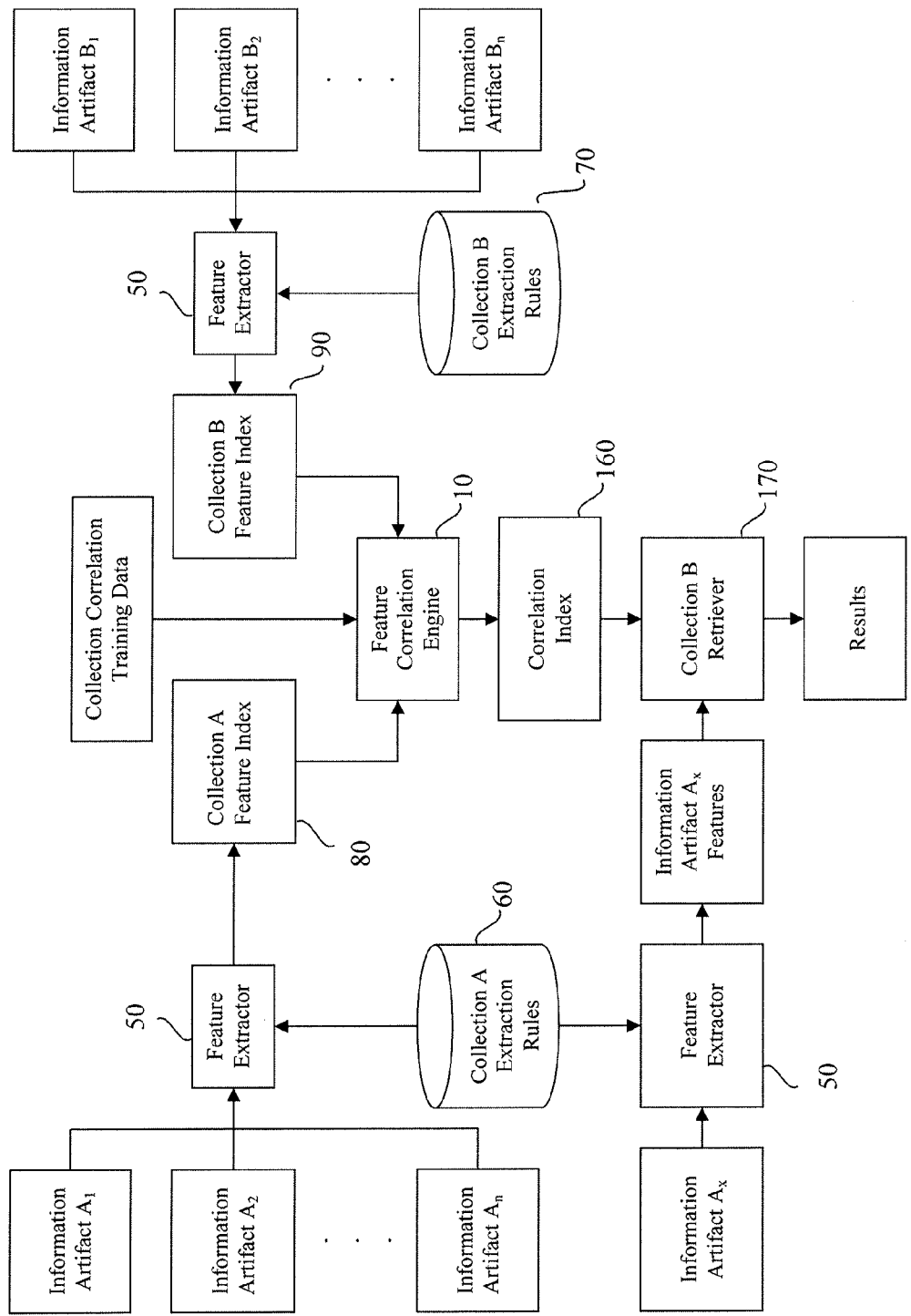
FIG. 3 is a schematic representation of an implementation of the Cross-Domain Feature Correlation methodology according to an embodiment.

Implementation of one embodiment of the Cross-Domain Feature Correlation methodology is shown in FIG. 3 in which information artifacts $A_1, A_2 \ldots A_n$ and $B_1, B_2 \ldots B_n$ are correlated. In this embodiment, Feature Extractor 50 can be customized or otherwise specialized with extraction rules specific to each collection and optionally stored, respectively, in Collection A Database 60 and Collection B Database 70. Feature Extractor 50 uses the extraction rules to create an index of features mapped to each information artifact, thereby creating Collection A Feature Index 80 and Collection B Feature Index 90.

Next, Feature Correlation Engine 10, using training data relating to a subset of the artifacts in Collection A to a subset of the artifacts in Collection B, creates a Correlation Index 160. In a preferred embodiment, Correlation Index 160 contains one or more tables optionally comprising the following columns, although other columns and tables are possible: (i) feature from Collection A; (ii) feature from Collection B; and (iii) the Correlation Score.

According to one embodiment, when information artifact $A_x$—a new or existing information artifact from Collection A—needs to be correlated with information artifacts from Collection B, Feature Extractor 50 is applied to the artifact to produce the set of features representing the artifact. The Collection B Retriever 170 then applies Correlation Index 160 to the information artifact $A_x$ Features to produce a list of artifacts from Collection B ranked by a similarity score.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for data correlation comprising the steps of:
providing a first correlation between a first information artifact collection and a second information artifact collection;
extracting at least a first feature from a second information artifact in said first information artifact collection and at least a first feature from a second information artifact in said second information artifact collection, wherein said extraction step comprises the steps of: (i) identifying at least a first lexical category in a second information artifact in said first information artifact collection; (ii) identifying at least a first phrase in said information artifact; (iii) normalizing at least a first term in said information artifact; (iv) removing all features except for nouns, verbs, and phrases from said information artifact; and (v) removing each feature that occurs only once in said information artifact;
selecting at least said first extracted features from said first and second information artifact collections;
creating a correlation index between said selected features, wherein said creating step comprises the steps of: (i) pairing at least a first feature extracted from said second information artifact in said first information artifact collection with at least a first feature extracted from a second information artifact in said second information artifact collection; and (ii) calculating a correlation score between said paired features;
extracting at least a first feature from a third information artifact in said first information artifact collection;
applying said correlation index to said first feature extracted from said third information artifact; and
computing a correlation score between said first feature extracted from said third information artifact and at least a first feature from one or more information artifacts in said second information artifact collection.

2. The method according to claim 1, wherein said extracting steps use said first correlation to identify which features to extract.

3. The method according to claim 1, wherein said first correlation links a feature from a first information artifact in said first information artifact collection to at least a first feature from a first information artifact in said second information artifact collection.

4. The method according to claim 1, wherein said extracting steps comprise at least a first set of extraction rules.

5. The method according to claim 4, wherein said extracting steps comprise a set of extraction rules for each of said first and second information artifact collections.

6. The method according to claim 1, wherein said selecting step comprises selecting every feature extracted from said first and second information artifact collections.

7. The method according to claim 1, wherein said selecting step further comprises the step of:
filtering said extracted features using a first filter.

8. The method according to claim 7, wherein said first filter is a term frequency—inverse document frequency filtering method.

9. The method according to claim 1, wherein said correlation index comprises a correlation table, said correlation table further comprising said paired features and said calculated correlation score.

10. The method according to claim 1, wherein said applying step further comprises the steps of:
comparing said extracted feature from said third information artifact to each feature in said correlation index; and
matching said extracted feature from said third information artifact to one feature from at least one paired feature in said correlation index.

11. The method according to claim 10, wherein said applying step further comprises the step of:

retrieving the matching feature pair from said correlation index.

12. The method according to claim 11, wherein said method for data correlation further comprises the steps of:
using said computed correlation score to rank each retrieved feature.

13. A non-transitory computer-readable storage medium containing program code comprising:
program code for providing a first correlation between a first information artifact collection and a second information artifact collection;
program code for extracting at least a first feature from a second information artifact in said first information artifact collection and at least a first feature from a second information artifact in said second information artifact collection;
program code for selecting at least said first extracted features from said first and second information artifact collections;
program code for creating a correlation index between said selected features, wherein said program code for creating a correlation index further comprises the steps of: (i) pairing at least a first feature extracted from said second information artifact in said first information artifact collection with at least a first feature extracted from a second information artifact in said second information artifact collection; and (ii) calculating a correlation score between said paired features;
program code for extracting at least a first feature from a third information artifact in said first information artifact collection;
program code for applying said correlation index to said first feature extracted from said third information artifact, wherein said correlation index comprises a correlation table, said correlation table further comprising said paired features and said calculated correlation score, and wherein said program code for applying said correlation index to said first feature extracted from said third information artifact further comprises the steps of: (i) comparing said extracted feature from said third information artifact to each feature in said correlation index; and matching said extracted feature from said third information artifact to one feature from at least one paired feature in said correlation index; and
program code for computing a correlation score between said first feature extracted from said third information artifact and at least a first feature from one or more information artifacts in said second information artifact collection.

\* \* \* \* \*